June 24, 1952 — I. R. BRENHOLDT — 2,601,248
PIPE LINE CLEANER AND LOCATOR
Filed Dec. 30, 1948 — 5 Sheets-Sheet 1
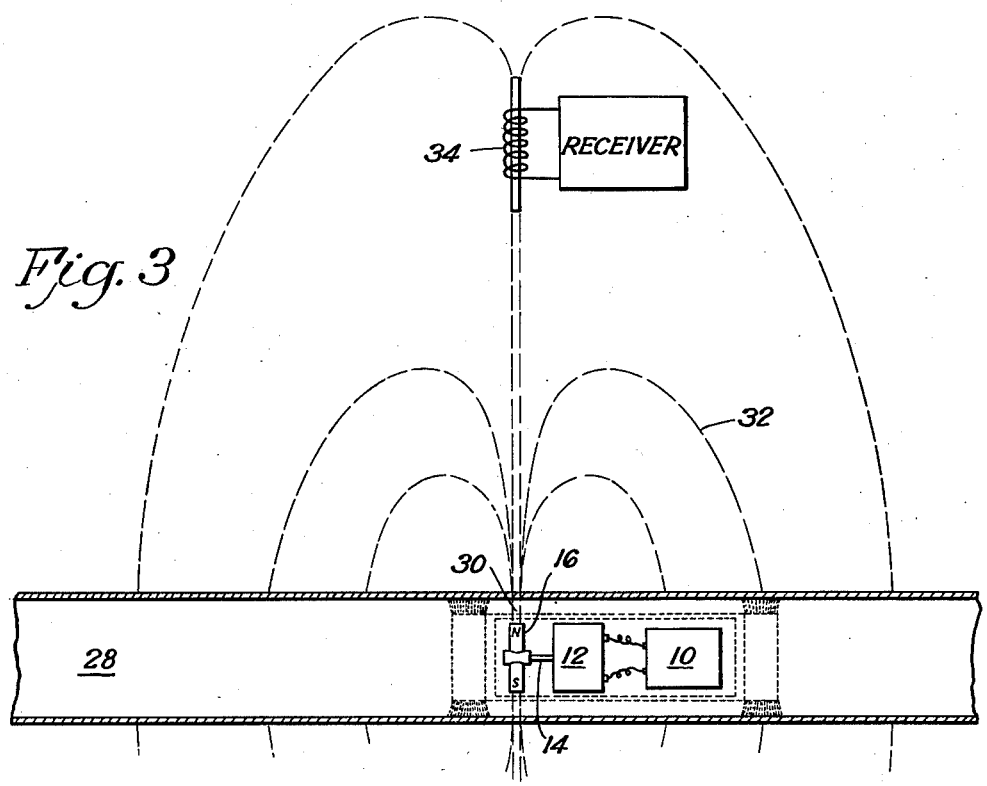
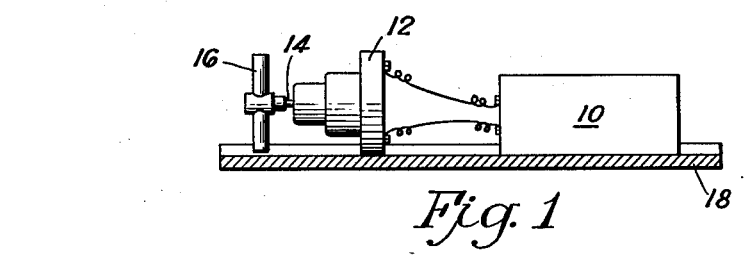
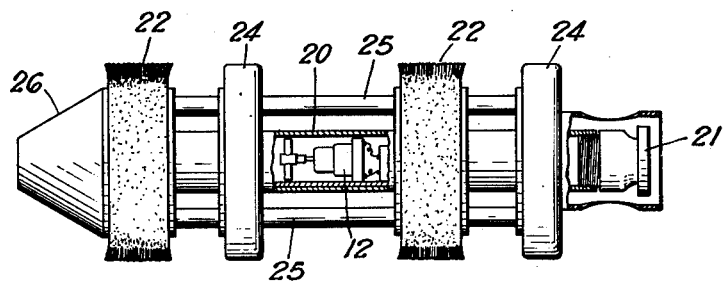
INVENTOR.
Irving R. Brenholdt
BY
ATTORNEY June 24, 1952     I. R. BRENHOLDT     2,601,248
PIPE LINE CLEANER AND LOCATOR Filed Dec. 30, 1948     5 Sheets-Sheet 2

INVENTOR.
Irving R. Brenholdt
BY
ATTORNEY

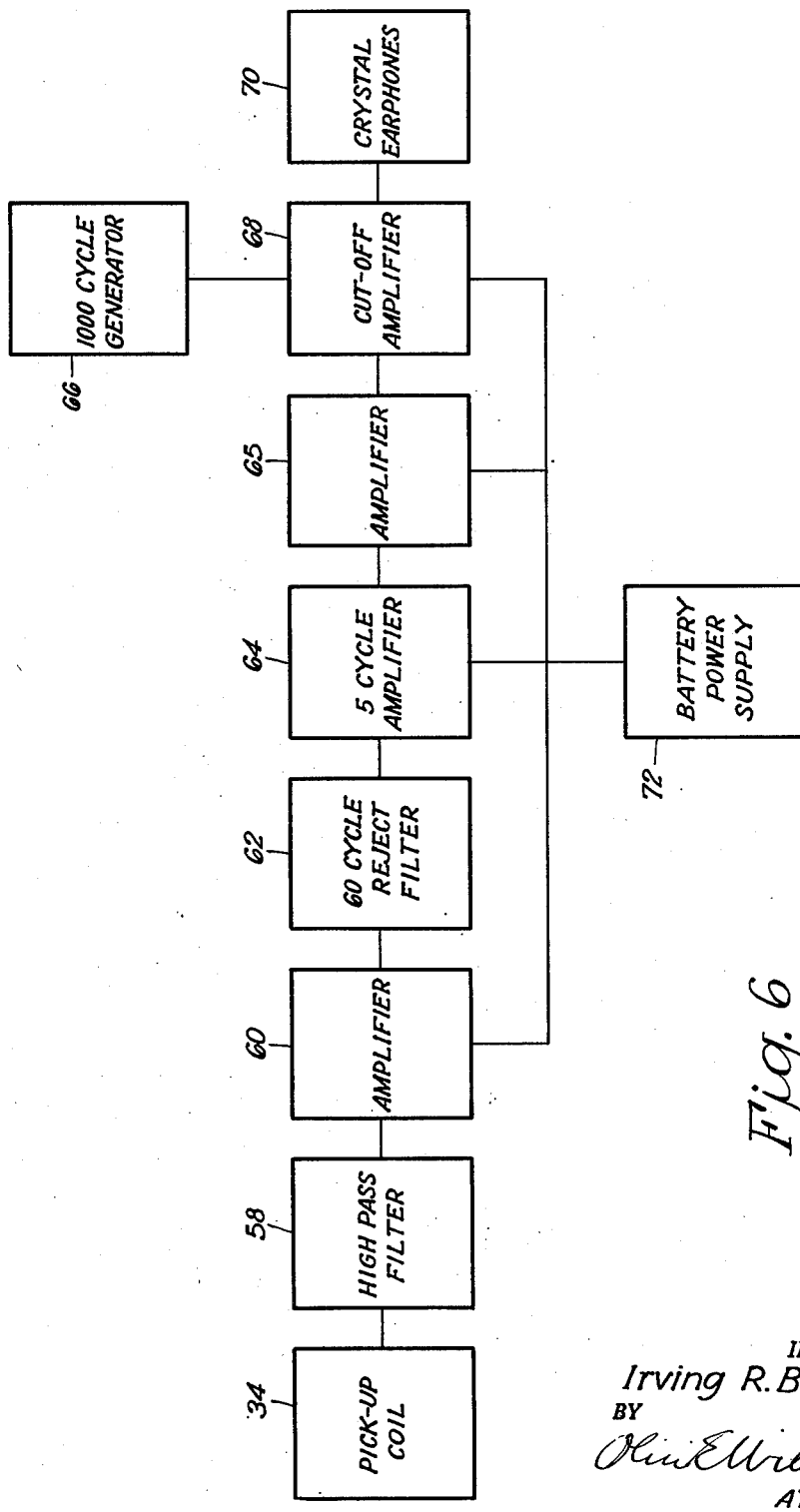

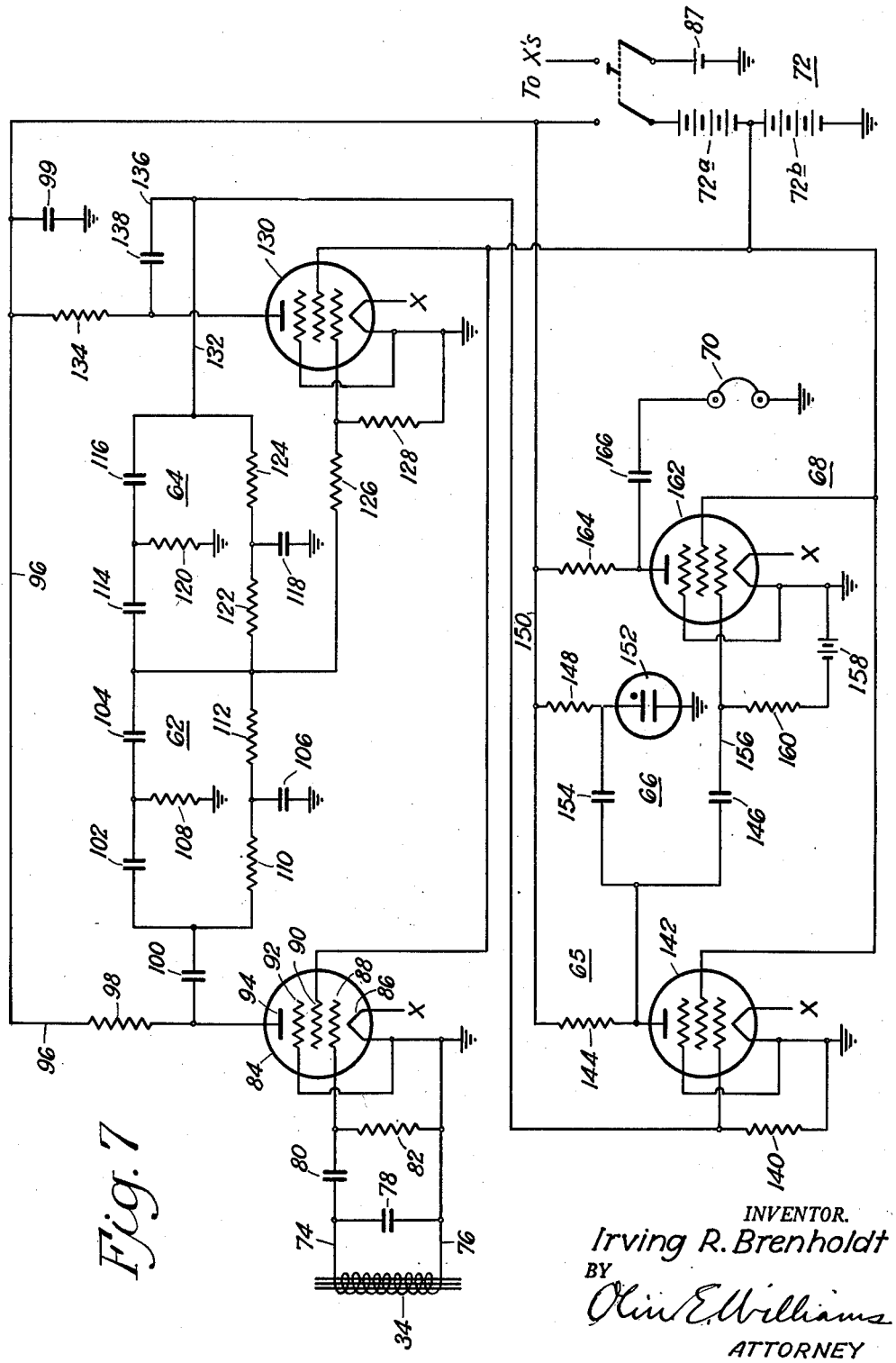

June 24, 1952     I. R. BRENHOLDT     2,601,248
PIPE LINE CLEANER AND LOCATOR
Filed Dec. 30, 1948     5 Sheets-Sheet 5
NORTH
A 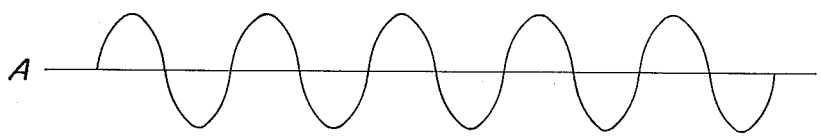
B 
C 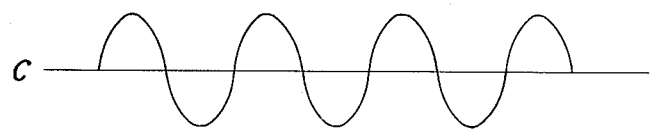
D 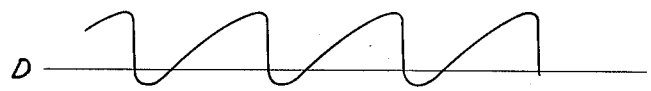
E 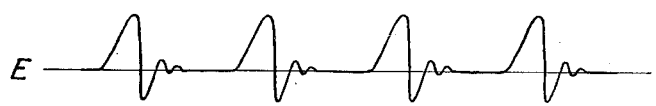
F 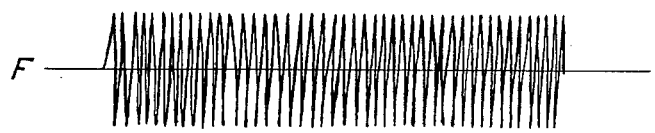
G 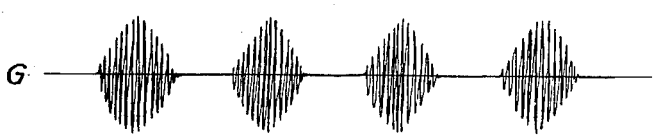
*Fig. 8*
INVENTOR.
Irving R. Brenholdt
BY
ATTORNEY Patented June 24, 1952

2,601,248

UNITED STATES PATENT OFFICE 2,601,248

PIPE LINE CLEANER AND LOCATOR

Irving R. Brenholdt, Chicago, Ill., assignor to Standard Oil Company, Chicago, Ill., a corporation of Indiana Application December 30, 1948, Serial No. 68,205

3 Claims. (Cl. 175—183)

This invention relates to apparatus for locating cleaning apparatus in pipe lines and has reference more particularly to signaling devices for locating, or tracing the course of, cleaning apparatus in pipe lines.

Pipe lines frequently become obstructed with sediment, deposited paraffins and the like and must be cleaned in order to restore normal unobstructed flow of the line. A device commonly employed for such cleaning is a scraping apparatus known as a go-devil, which is forced through pipe lines by the pressure of fluid flowing therethrough. The operation of such pipe line cleaners is attended by the disadvantage that they occasionally encounter and are stopped by obstructions, and are then difficult to locate particularly inasmuch as they are often employed over considerable distances and their rate of travel can only be approximated.

It is, therefore, an object of the present invention to provide means and apparatus for locating go-devils in pipe lines. It is another object of the invention to provide signaling apparatus whereby the position of the pipe line cleaner can be located at any time during its travel through a pipe line and so that its rate of travel can be accurately determined.

The invention has for other objects such other advantages or results as will appear in the description of the apparatus hereinafter given.

The customary depth of pipe lines renders unsatisfactory reliance upon sound emitting devices for the purpose of locating pipe line scrapers, and furthermore places severe limitations upon the type of signal that may be employed for indicating pipe line scraper location. In addition, the inherent nature of the pipe line is usually such that the pipe itself would filter out or block the signal and prevent it from reaching the surface. The employment of the Radar echoing method is suitable insofar as the fact that an ultra high frequency wave would carry through a steep pipe of circular section, but interferences arising from imperfection in the pipe, such as roughness at the welded joints and corroded sections, would seriously diminish the signal strength both by absorption and reflection. Sound waves, beforementioned, would require an excessive power source in view of the space and weight limitations of a signaling device suitable for incorporation within the scraper. A second disadvantage of sonic devices is the loss of intensity which occurs when an acoustical wave travels from the earth to the air. This loss in intensity is great enough to incur the disadvantage of requiring an earth sounding in order to pick up the signal. High frequency waves would be useless in the present instance because of their inability to penetrate the steel walls of the pipe line. The use of radioactive sources is precluded by the fact that earth layers above the pipe line of greater depth than about two feet would require dangerously strong radioactive sources, for example, of considerably greater than a reasonably safe 10 millicuries intensity.

It has now been found that the aforementioned objects can be accomplished by the employment of low frequency elctromagnetic waves which will give rise to an induced field external to the pipe and will produce a readily identifiable signal at and above the surface of the ground. Briefly stated, the present invention comprehends, therefore, the provision of a source of electromagnetic waves, for example, a rotating permanent magnet or an electromagnet oscillating at low frequency combined with a pipe line scraper in such manner as not to interfere with operation of the latter and suitable receiving apparatus adapted to receive, amplify and convert the electromagnetic impulse to an audible, visual, or recorded signal. The low frequency electromagnetic source is operably connected to power means, such as a battery and motor operated thereby in the case of the rotating permanent magnet, or a battery and interrupter in the case of the electromagnet. The rotating permanent magnet can also be operated by fluid flow through elements of the pipe cleaner and be maintained by suitable governor apparatus at a proper rate of rotation so that there will be emitted a wave of identifiable frequency. Such transmitters are attached to the pipe line scraper in a manner so as not to retard the scraper in its travel. The provided receiver apparatus includes, in addition to amplifying means, circuits so arranged as to filter out adventitiously present signals, particularly those derived from 60 cycle current and those arising from movement of receiver apparatus in the earth's field; for example, both Wien filters and negative feed-back filter circuits are employed. Depending on whether the apparatus is to be used to record the passing of the pipe line scraper at any point, or whether it is to be transmitted, for example, by wireless telegraph, to a central receiving station, or is to be received as an audible signal in the field, suitable transmitting or receiving apparatus is combined to provide the apparatus of invention. In case an audible signal is to be received, the receiver includes means for converting a signal from the low electromagnetic frequency aforestated to one within the audible range.

Embodiments of the invention, in which there are employed two different sources of low frequency electromagnetic waves, are illustrated in the drawings of which Figure 1 is an elevational view of signaling apparatus employing a rotating permanent magnet;

Figure 2 is a simplified elevational view of a pipe line scraper with parts broken away so as to show assembled therewith the apparatus of Figure 1;

Figure 3 is a diagram of the wave pattern produced by the apparatus of Figure 1;

Figure 6 is a schematic diagram of receiver apparatus suitable for use with either transmitter and adapted to produce an audible signal;

Figure 7 is a circuit diagram of the receiver illustrated schematically in Figure 6; and Figure 8 is an illustration of typical wave shapes of electromagnetic signals, including superimposed interfering signals, and of a resultant audible signal.

Figure 5:
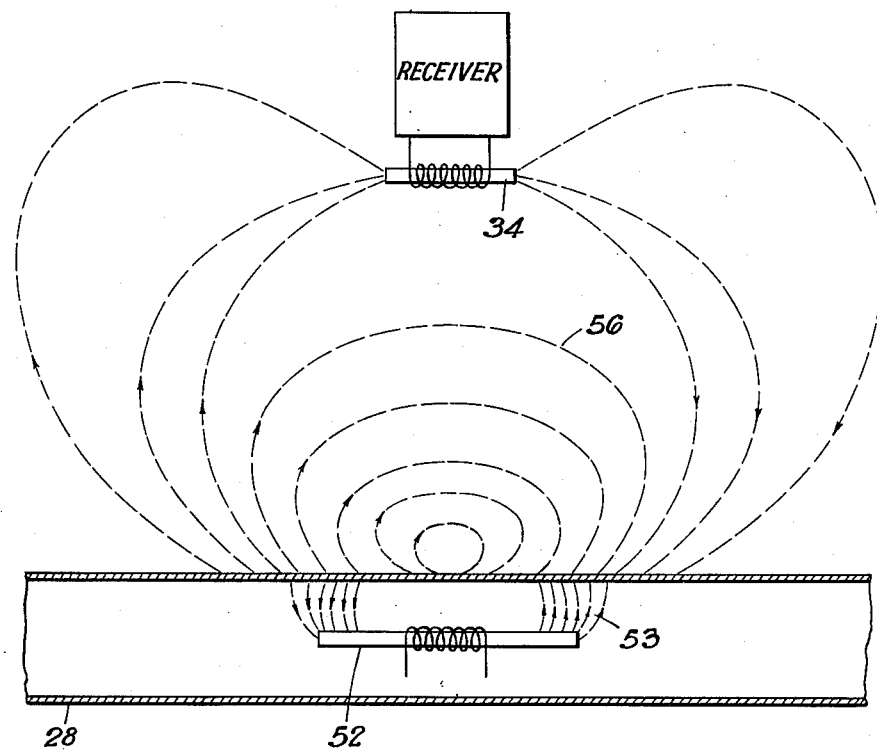
Figure 5 is a diagram of the wave pattern produced by the apparatus of Figure 4.

Referring specifically to Figure 1, there is disposed in operative connection a battery 10 which operates a small electric motor 12. The electric motor 12 drives the shaft 14 and a permanent magnet 16, and can, of course, operate through a gear reducer (none shown) if preferred. The magnet 16, which can be a permanent magnet such as Alnico, is mounted on the driven shaft 14 and disposed at right angles to the axis thereof. It is caused to rotate by the described apparatus at a rate of five revolutions per second so as to provide an oscillating magnetic field of five cycles per second. The entire assemblage is mounted on a longitudinally extending base 18 whereby the assemblage can be inserted into a hollow tube 20 constituting the central shaft of the pipe line scraper illustrated in Figure 2. The tube 20 is preferably constructed of stainless steel and is sealed by a threaded plug 21. The pipe line scraper of Figure 2 is conventionally equipped with wire brushes 22 and rubber rimmed driving discs 24 and several longitudinally extending supporting tubes or grommet pipes 25 through which the fluid in the pipe line can be permitted to flow during operation of the pipe scraper. The forward end of the scraper relative to its course of travel in the pipe line is constructed in the form of a cone 26 to adapt the scraper as an effective displacement tool.

The electromagnetic wave pattern produced by the rotating magnet 16 is shown in Figure 3 in which the magnet, in operative connection with the remainder of the sending assemblage, is shown for purpose of clarity in considerably enlarged scale in a pipe line 28 at a single position of its rotation. As diagrammatically indicated therein, the magnet 16 produces a primary field shown by lines 30, thereby inducing a secondary external field diagrammatically illustrated by magnetic flux lines 32. The induced field is intercepted by a pick up coil 34 which constitutes an integral part of the receiver apparatus shown in Figure 6. The field which is generated to maximum, reduced to zero, and then reversed by the rotating magnet is detected by the pick-up coil 34 in which a voltage is thereby induced. The signal is amplified, is separated from interfering frequencies and is converted to an audible signal by apparatus hereinafter described.

Figure 4:
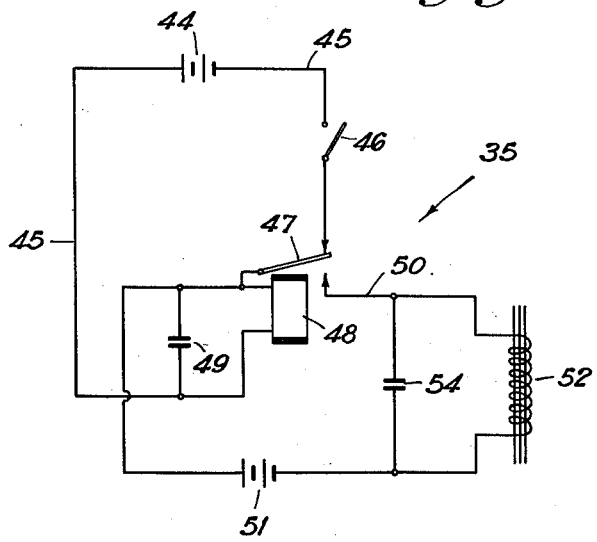
Figure 4 is a circuit diagram of a transmitter employing an oscillating electromagnet.

Shown in Figure 4 is the circuit diagram of a transmitter apparatus 35 that can be arranged similarly to that illustrated in Figure 2 so that this transmitter also can be mounted on the base 18 and inserted in the hollow tube 20 of a pipe line scraper. Transmitter 35 consists of an oscillating, battery-powered electromagnet circuit and an interrupter circuit. The interrupter circuit comprises a battery 44 which supplies current through a lead 45 in which is disposed a manually operated switch 46, an armature 47, a wound core 48 and a condenser 49. The oscillator operates in a conventional manner; current flowing through the wound core 48 attracts the armature 47 thereby causing movement of the armature and the breaking of the said interrupter circuit. The armature 47 is held in retained position against the wound core 48 for a brief moment longer by the flow back of current previously stored in the condenser 49. When this charge is dissipated, the armature is released and current again flows into the wound core 48. The period of this oscillation can be controlled by selecting the capacity of the condenser 49. In the present embodiment, the selected condenser is of such capacity that an oscillation of five times per second is obtained. When the armature is held in such position that the interrupter circuit is opened, the electromagnet circuit including lead 50 will be closed. This circuit comprises the said lead, a battery 51, the armature 47 and an electromagnet 52 consisting of a wound iron core. A condenser 54 is disposed across the lead 50 for the purpose of preventing sparking at the armature.

This embodiment, in which transmitters employing oscillating electromagnets broadcast the electromagnetic signal, is described and claimed in my copending application, Ser. No. 170,611 filed June 27, 1950.

The field produced by the said electromagnet 52 is shown diagrammatically in Figure 5. The electromagnet 52 of Figure 5 is shown separated from other elements of its assemblage disposed longitudinally in a pipe 28. A primary field produced by the electromagnet at one point in its oscillation is indicated by magnetic flux lines 53 and the secondary induced field by lines 56. Disposed within the electromagnetic secondary field is the pick-up coil 34 which forms an integral part of the receiver apparatus described in Figures 6 and 7.

Referring now to the schematic diagram of the detector apparatus illustrated in Figure 6, the pick-up coil 34 intercepts the oscillating magnetic field shown in Figures 3 and 5. The voltage impressed upon the pick-up coil 34 includes all undesirable signals of varying frequencies. A major portion of the low frequencies incidentally produced by movement in the earth's field of the detector apparatus, which can be portable and is ordinarily housed in a carrying case, are eliminated by a high-pass filter 58. The resultant signal is directed to an amplifier circuit 60. The amplified signal is thereafter directed to a pair of interference filters 62 designed to eliminate particularly sixty cycle signals that may be induced by nearby power transmission lines and includes a negative feed-back circuit shown in greater detail in Figure 7. The resultant five cycle per second signal is amplified by an amplifier circuit 64 and an additional amplifier 65 and serves to key a 1,000 cycle per second signal produced by the saw-tooth-wave neon tube generator 66. The modulated wave form so produced is thereafter directed to a bias grid pentode circuit or cut-off amplifier circuit 68 whereby the 1,000 cycles per second signal is permitted to pass only at 5 cycles per second intervals. This audible signal is received by crystal earphones 70. The amplifiers 60, 64, 65, and 68 are power supplied by a battery 72.

Figure 7 shows in considerably greater detail the electrical circuit constituting the receiver apparatus. Extending from the pick-up coil 34 are leads 74 and 76 across which is connected a condenser 78 tuned in resonance with the coil 34 at the frequency of 5 cycles per second. A condenser 80 disposed in line 74 constitutes the high-pass filter 58 for incidental elimination of the very low frequencies generated by waving the receiving case, and acts further as a coupling condenser. Disposed across the leads 74 and 76 is a grid resistor 82. Pentode 84 of conventional construction consists of a filament 86 supplied through a lead (not shown) by a battery 87, controlled grid 88, screen grid 90, suppressor grid 92 and plate 94 upon which is imposed a voltage of 45 volts supplied through lead 96 having disposed therein a plate load resistor 98, and by-pass condenser 99. A coupling or blocking condenser 100 delivers the amplified signal from the pentode 84 to a Wien type interference filter 62 of conventional arrangement. The circuit includes condensers 102, 104, and 106 and resistors 108, 110, and 112. The values of these components are selected so as to eliminate 60 cycle frequencies. The resulting voltage filtered at 60 cycle interfering frequency, is imposed on an interference filter and 5 cycle amplifier which includes condensers 114, 116, and 118 and resistors 120, 122 and 124. The interference filter is a part of a negative feed-back circuit which also includes resistor 126, grid resistor 128, plate load resistor 134, coupling condenser 138, and pentode 130. The pentode 130, upon which is imposed a plate voltage of 45 volts from the lead 96 and plate load resistor 134 delivers a reversed signal containing all frequencies received from interference filter 62 to the lead 136, containing the coupling condenser 138. All such frequencies are fed through to the interference filter in reversed phase to the input lead of amplifier tube 130 with the exception of the 5 cycle signal which is removed by the filter. The undesirable frequencies are thereby canceled out by the reversed phase signals. The remaining amplified 5 cycle signal which alone remains and is present on the output lead 136 is thereafter delivered to the amplifier circuit 65 containing conventional grid resistor 140, pentode 142, plate load resistor 144, and coupling condenser 146. The saw-tooth wave neon tube generator 66 comprises a resistor 148 through which voltage is delivered from the lead 150 and in operation a reduced voltage of approximately 75 volts exists across the neon tube 152. Disposed in the generator circuit is a condenser 154 of such capacity that the neon tube will become ionized and conduct accumulated charge from the said condenser 154 away to ground at intervals of approximately 1000 cycles per second. The modulated signal comprising both 1000 cycles per second and 5 cycles per second frequencies is produced in a lead 156 from the coupling condenser 146 to the cut-off amplifier circuit 68 that comprises a negative grid bias battery 158, a resistor 160, a pentode 162 of conventional construction, a plate load resistor 164 and a coupling condenser 166. The cut-off amplifier 68 functions in such manner that the modulated wave signal delivered thereto decreases the negative potential on the grid of the pentode 162 at those moments at which the aforesaid signal is at a maximum positive potential and therefore a signal similar to that shown in Figure 8, wave diagram G, is delivered to the said earphones 70. The battery power supply 72 imposes approximately 45 volts positive potential upon the screen grids 90 of the pentodes 84, 130, 142, and 162 and a 90 volt potential is supplied through leads 96 and 150 to the various resistors disposed therebetween and the plates 94 of the pentodes.

The table of preferred values for the above described circuit in one employed embodiment of the apparatus is hereinafter given:

| Condensers | Microfarads |
| --- | --- |
| 78 | .07 |
| 80 | .005 |
| 100, 138, 146 | .01 |
| 114, 116 | .02 |
| 102, 104, 166 | .001 |
| 106 | .013 |
| 116 | .015 |
| 99 | 50 (150 volts) |
| 154 | .0002 |

| Resistors | Megohms |
| --- | --- |
| 98, 134, 144, 164 | 0.18 |
| 110, 112 | 1.0 |
| 108 | 2.7 |
| 122, 124 | 2.0 |
| 120 | 0.34 |
| 148 | 4.7 |
| 82, 126, 128, 140, 160 | 10.0 |

| Batteries | Volts |
| --- | --- |
| 158 | 7½ |
| 72a and 72b | 45 |
| 87 | 1½ |

In summation of the description of apparatus providing an electromagnetic signal which is amplified and converted to an audible impulse, Figure 8 consists of a series of wave patterns such as are produced by the hereinbefore described apparatus. Curve A illustrates the polarity and intensity of the electromagnetic field produced by the rotating permanent magnet 16. Curve B illustrates the voltage induced in the pick-up coil 34 by the said field produced by the rotating permanent magnet 16, and shows the influence of a hypothetical group of interfering signals, including both 60 cycle signals and those induced by movement of the transmitter in the earth's field. Curve C shows the voltage input to amplifier 65 at which point substantially all interfering signals have been eliminated. Curve D indicates the intensity and polarity of the electromagnetic field induced by the oscillating electromagnetic transmitter described in Figure 4. The voltage input to the first amplifier of the receiver apparatus described in Figures 6 and 7 that is provided by the electromagnetic field illustrated in Curve D is shown without a superimposition of interfering signals in Curve E. Curve F represents the 1000 cycle per second saw-tooth wave provided by the neon tube generator 66. Curve G represents the resultant audible signal provided by a modulation of the amplified 5 cycle per second signal with the 1000 cycle per second signal, and a subsequent amplification of the 1000 cycle per second signal at 5 cycle per second intervals. Curve G corresponds to the audible signal that is obtained as a resultant of the amplification and conversion of either the electromagnetic signal indicated in Curve A or that shown in Curve D.

It is understood that the combination of invention is not limited to the receiver apparatus hereinbefore described but that other conventional filtering and amplifying circuits may be employed. Further, the signal need not be converted to an audible impulse in the manner described, but rather it may as well be employed to alert the visual signal or to excite sending apparatus disposed, for example, at fixed points along a pipe line whereby a path of a pipe line scraper can be followed to a central station.

The said pipe line scrapers are used extensively in pipe lines employed for handling petroleum products. Long distance petroleum pipe lines are usually supplied with traps into which the godevils and accumulated sediment will be delivered and from which both can readily be removed. An advantage of the present invention accrues in the fact that the locating signal apprises those at the surface of the presence of the pipe cleaner and avoids the need of having operating crews stand idle for extended periods waiting for its arrival.

Having now described my invention, what I claim is:

1. In locatable pipe cleaner apparatus having a transmitter integrally assembled to travel with a pipe line scraper and a selective amplifier receiver to detect the presence of the scraper in a pipe by receiving and amplifying a fixed-frequency magnetic signal from the transmitter, the apparatus comprising: a battery supported within a hollow housing disposed along the axis of the scraper; a constant-speed motor driven by the battery in wired connection therewith and also contained within the hollow housing; a permanent magnet mounted on a shaft driven by the said motor and disposed within the hollow housing and rotated at a uniform rate so that a magnetic field excited in the pipe by the permanent magnet will reverse in polarity at a uniform, low frequency and induce a secondary magnetic field outside the pipe to which the said selective amplifier is responsive to detect the presence of the said scraper.

2. A signal transmitter for use with a pipe line scraper and for transmitting a magnetic signal to a selective amplifier receiver for indicating the presence of the scraper in a pipe by receiving and amplifying a magnetic signal of fixed frequency regardless of any relative motion between the scraper and the pipe, which transmitter comprises a closed hollow tube disposed along the axis of the scraper, a battery enclosed in said tube, a constant speed motor enclosed in said tube and powered by the said battery to operate continuously regardless of relative movement between the scraper and the pipe, a permanent magnet mounted on a shaft driven by said motor and enclosed in said tube, said magnet being mounted at right angles to the axis of said pipe, whereby the magnet is rotated by said motor at such a uniform rate that a magnetic field excited in the pipe by the permanent magnet will reverse at a fixed low frequency and thereby induce a secondary magnetic field outside of the pipe to which field said receiver is responsive to indicate the presence of the scraper.

3. A signal transmitter for use with a pipe line scraper without interfering with passage of the scraper through a pipe line and for transmitting a magnetic signal to a selective amplifier receiver for indicating the presence of the scraper in a pipe by receiving and amplifying a magnetic signal of uniform low frequency independent of any relative motion between the scraper and the pipe, which transmitter comprises a closed housing carried by said scraper for movement therewith through the pipe, a magnet mounted for rotation in said housing in a plane transverse to the axis of the pipe, a housed battery-driven motor also carried by said scraper and operatively engaging said magnet for effecting rotation thereof at constant rate independent of any relative movement between the scraper and the pipe, and a housed battery also carried by said scraper and electrically connected to drive said motor whereby the magnet is rotated by said battery-driven motor in a plane transverse to the pipe axis at such uniform low rate that a reversing magnetic field is excited in the pipe at a uniform low frequency and a secondary magnetic field is induced outside of the pipe to which last named field the selective amplifier receiver is responsive to indicate the presence of the scraper.

IRVING R. BRENHOLDT.

REFERENCES CITED

The following references are of record in the file of this patent:

UNITED STATES PATENTS

| Number | Name | Date |
| --- | --- | --- |
| 658,013 | Iddings et al. | Sept. 18, 1900 |
| 1,662,429 | Lowy | Mar. 13, 1928 |
| 2,092,951 | Blake | Sept. 14, 1937 |
| 2,192,765 | Blake | Mar. 5, 1940 |
| 2,428,326 | Fay | Sept. 30, 1947 |
| 2,542,893 | Bender et al. | Feb. 20, 1951 |